3,015,636
Patented Jan. 2, 1962

3,015,636
SULFUR CURING OF POLYETHER-URETHANE RUBBERS
Otto C. Elmer, Akron, Ohio, assignor to The General Tire & Rubber Company, Akron, Ohio, a corporation of Ohio
No Drawing. Filed Oct. 24, 1957, Ser. No. 692,028
16 Claims. (Cl. 260—18)

This invention relates to polyurethane polymeric compositions. It particularly relates to curable rubbery and rigid polyether-urethane polymers and to a method of preparing said polymers.

The high polymers of polyether-urethanes, and particularly those which are predominantly composed of linear molecules, have wide commercial possibilities; but, their utilization has been greatly retarded because of the fact that they can be stored compounded ready for cure and for application to tires, etc., for only limited periods of time before they are processed into a final article. The long-chain polyurethane polymers, particularly the linear polyether-urethane rubbery polymers, are prepared by reacting a generally linear polyalkylene ether glycol with one or more organic diisocyanates. In the preparation of these materials the diisocyanate links shorter polyether molecules together into long chains, and also excess isocyanate over that which is required to react with the polyether molecules in a molar 1:1 ratio remains in the polymer to act as a curing or crosslinking agent, which changes the plastic linear molecules to a nonplastic, crosslinked network.

It has been considered necessary to utilize a very substantial excess of isocyanate to provide curing properties in the polyether-urethane polymers. The excess isocyanate reacts not only at elevated temperatures but also reacts relatively rapidly at room temperatures, so that the plastic urethane polymers generally must be used promptly and with great care after they are prepared to provide the desired shaped articles. This results in a marked disadvantage and has prevented the substantial use of the polyurethane polymers, particularly the linear polyether rubbers, in the manufacture of complex molded articles, such as pneumatic tires and the like.

In order to overcome this setup after the preparation of the polymer, it has been proposed to manufacture the polyurethane polymer with a deficiency or a very slight excess of isocyanate and to later add the substantial excess isocyanate required for curing just before it is desired to use the article. With this two-step addition, there is some indication that the quality of the cured polymer is not as high as that formed with a one-step addition of substantial excess. Such procedure, while somewhat better than adding all of the isocyanate initially, still is disadvantageous in that the materials are scorchy and very difficult to handle in preparing articles because reaction with isocyanate for crosslinking occurs not only at elevated temperatures but also at normal temperatures at a very rapid rate.

While the polyester urethane polymers generally have suitable physical properties for production of tires, belting and the like such as high abrasion resistance, the polyether-urethane rubbers generally have better resilience, low temperature flexibility and are better adapted for the production of articles that require excellent resistance to high humidity, particularly at elevated temperature.

Attempts to cure certain unsaturated polyether-diisocyanate polymers prepared by a 1:1 molar ratio by sulfur in order to eliminate the disadvantages of diisocyanate curing have failed. Sulfur curing of polymers formed by reacting an unsaturated polyester generally with a substantial excess of diisocyanate over a 1:1 molar ratio is shown in United States Patent No. 2,424,884. The large excess of isocyanate in these polymers undoubtedly provided the main curing agent so that the rubbery properties of the cured elastomer were often inferior and unsatisfactory for use in articles such as pneumatic tires. Furthermore, as previously pointed out, the polyester-urethanes are relatively degraded upon exposure to humidity.

It is an object of the present invention to provide humidity resistant polyether-urethane compositions which may be compounded ready for curing and stored for substantial periods, which may be milled without scorching, and which may be vulcanized by merely subjecting the compositions to elevated temperature and pressure without adding substantially additional isocyanate or other material after the required storage period.

It is another object of the present invention to provide a method of making such compositions.

Carbon black, when added to ordinary synthetic rubbers, has marked beneficial effects, both in increasing the strength and increasing the abrasion and cut resistance of the article. When added to rubbery polyurethanes, carbon black has been considered to have quite the opposite effect in that it ordinarily decreases the desirable properties of the resultant polymer.

It is a further object of the present invention to provide a method of making humidity resistant polyether-urethane compositions which can be compounded with carbon black as well as other pigments and powders and cured to provide improved properties in the composition.

It is a still further object of the present invention to provide a rubbery polyether composition which can be cured, stored and compounded with carbon black in the same manner with about the same ease as one experiences with the ordinary rubber compositions.

I have found that polyurethane polymers substantially prepared by reacting linear hydroxy terminated polyethers and specially selected unsaturated glycols with organic diisocyanates, even without molar excess diisocyanate, may be cured by sulfur provided the unsaturated bonds in the molecular chain are properly spaced from the urethane linkages. A portion, preferably minor, of the total amount of polyol used to form the polyetherurethane is an unsaturated organic hydroxy compound having an unsaturated carbon to carbon bond in a molecular chain with at least one of the carbon atoms forming the unsaturated linkage directly connected to a plurality of at least five aliphatic carbon atoms which are entirely free of oxygen atoms. This arrangement is apparently necessary in order to activate or make available the unsaturated linkages for crosslinking sites.

Polyether-urethanes having unsaturated bonds adjacent the urethane linkages of the urethane polymer apparently do not operate in the same manner toward sulfur crosslinking and frequently appear to be degraded by sulfur.

The best physical properties are obtained in sulfur cured polyether-urethanes when the unsaturated linkage is directly connected on at least one side by at least seven consecutive aliphatic carbon atoms which are preferably methylene groups. The unsaturated double bond linkage may be part of a cyclic structure which is appended to a main chain and which cyclic structure forms a plurality of methylene groups, preferably seven. The double bond may also be appended to the cyclic structure which is itself a substituent appending from the main polymer chain.

When the double bond is located in a non-cyclic side chain, at least one side of the double bond should be connected to a plurality of at least five consecutive aliphatic carbon atoms and preferably seven methylene groups in order to obtain the benefits of the present invention.

Examples of preferable olefinic compounds used in accordance with this invention as a minor constituent for forming the unsaturated polyethers are noted below with their structural formulae:

(1) Ricinoleyl alcohol

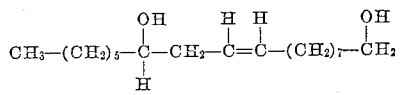

(2) Glycerol mono-oleate

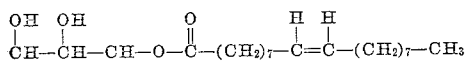

(3) Reduced linoleic alcohol dimer (dimer alcohol)

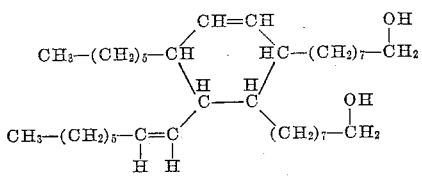

(4) Proplene glycol mono-ricinoleate

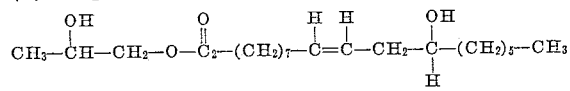

Other suitable olefinic compounds are glycerol mono-ricinoleate, glycerol mono-linoleate, glycerol mono-linoleneate, glycerol eruceate and glycerol undecylenate.

It is important the olefinic compound be one as described above as evidenced by the fact that compounds such as erythrol,

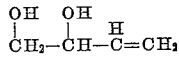

and 2-butene-1,4-diol

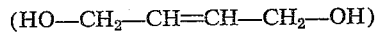

do not effect a satisfactory sulfur cure.

For most applications a dangling hydrocarbon portion in the molecule of the compound is preferred such as the $—(CH_2)_5—CH_3$ hydrocarbon portion at the end of the ricinoleyl alcohol molecule; the $—(CH_2)_5—CH_3$ portion at the end of the propylene glycol monoricinoleate molecule; and the $—(CH_2)_5—CH_3$ at the end of the reduced linoleic alcohol dimer molecule. The dangling hydrocarbon portion is preferably a substantially linear aliphatic hydrocarbon chain with at least 2 carbon atoms such as an ethyl, propyl, butyl, isobutyl or other aliphatic radical up to 10 or 12 carbon atoms or more such as decyl, undecyl and duodecyl.

The amount of the unsaturated organic compound used, based on the number of moles of the mixture of active hydrogen compound employed, is preferably about 20 to 50 mole percent of the mixture (polyalkylene ether glycol plus olefinic compound) although mole percentages from as low as 10 to as high as 55 or even 60 may be used.

The active hydrogen containing polyether is preferably a substantially linear polyalkylene ether glycol having a molecular weight of at least 500 and for best results should be terminated with hydroxyl groups or at least principally with hydroxyl groups although useful products can also be made with a substantial amount of end groups such as amino groups. Examples of polyethers which form the major part by weight of the polyol mixture used in making the rubbery products of the present invention are hydroxy terminated polyethers such as polypropylene ether glycol, polybutylene ether glycol, and polytetramethylene ether glycol. The molecular chain of the polyethers extending between the terminal hydroxyl groups preferably contains only carbon and oxygen atoms as part of the chain itself. It is preferred that the carbon to carbon linkages are not of the aliphatically unsaturated type, this unsaturation being preferably introduced into the polymer by means of the minor portion of the olefinic polyol compounds previously described.

While the sulfur cures of the present invention are applicable to polyurethanes of varying isocyanate/polyether equivalent weight ratios of about .9 to 1.5, the present invention is primarily concerned with polyether-urethanes which have an equivalent weight ratio of about 1:1, that is, those in which the amount of isocyanate is theoretically substantially equal to or only slightly short of that required to react with all of the hydroxyl groups in the polyether material. Those polyurethanes having no substantial excess of isocyanate remain plastic indefinitely, are not scorchy, and may be compounded and stored. When the amount of diisocyanate material is increased substantially above the 1:1 molar ratio of polyester isocyanate or polyether isocyanate, storageability is generally greatly decreased and scorchiness is greatly increased.

The polyethers used for preparing the improved polyurethane compounds have a molecular weight of at least 600 and preferably more; if materials rubbery at normal temperatures are desired, molecular weights of over 1000 are preferred and best results are obtained when the molecular weight range is 2000 to 3000 although molecular weights as high as 4000–5000 or more may be used.

When the molecular weight of the polyether used for reacting with the isocyanates is less than 500 or 600, the product, while plastic, is too rigid for application as rubbery base materials at ordinary temperatures. However, according to this invention, rigid polyurethanes may be cured. When the polyethers, for example, have molecular weights under 1000 and preferably under 500 to 600, rigid-type linear polyurethanes are formed which may also be advantageously converted to a non-thermoplastic state using the methods of this invention.

Rigid polyurethanes may also be produced by increasing the amount of crosslinking in the resultant polyurethane, for instance, by using a crosslinking agent, such as tri- or polyols, tri- or polyisocyanates or by using polyethers of the crosslinking type.

The preferred polyethers for polyurethane elastomers are polypropylene glycols, mixed poly(ethylene-propylene) ether glycols, and polytetramethylene ether glycol. Desirable properties for the polyethers are a very low acid number or no acid number and hydroxyl groups on the ends of the molecular chain.

Examples of suitable polyethers are from the class of polyalkylene ether glycols, such as polyethylene glycol, such as "Carbowax," having a molecular weight of about 1000, polypropylene glycols, polytetramethylene ether glycol, polytrimethylene ether glycol, polyneopentylene ether glycol, polypentamethyene ether glycol, preferably having a molecular weight of above 600 and preferably of about 2000 to 4000 and mixed polyalkylene ether glycols such as poly(ethylene-propylene) ether glycols.

The sulfur cure may be effected by a mixture of about .2 to 8 parts by weight of sulfur and preferably about .5 to 4 parts of sulfur based on 100 parts by weight of the polyurethane rubber together with ½ to 4 parts Altax and ½ to 4 parts ethyl Tuads. Altax and ethyl Tuads are well known rubber accelerators, Altax being benzothiazyl disulfide and ethyl Tuads being tetraethylthiuram disulfide. Other accelerators may be used such as methyl Tuads (which is tetramethyl thiuram disulfide), zinc dimethyl dithiocarbamate, mercaptobenzothiazole and the diisopropyl sulfuramide of 2-mercaptobenzothiazole. Other compounds such as zinc stearate, oleic acid or stearic acid may be used as de-tackifying agents in addition to the vulcanization agent and the accelerators. As well as those already mentioned, one or more additional compounds may be used such as fillers which include, for example, carbon black, silica, iron oxide, calcium carbonate, titanium dioxide and zinc oxide. These fillers are generally milled in a ratio of about 5 to 75 parts or more by weight based on the weight of the polyurethane.

Any reactive aliphatic or aromatic organic polyisocyanate preferably having two and only two readily reactive isocyanate groups may be used for reacting with the polyether, but those having both isocyanate groups of about equal reactivity are preferred for at least part of the total isocyanate present to facilitate growth of the polyurethane chains. Tri-functional polyisocyanates like tri-functional polyethers act as crosslinking agents and are undesirable for flexible articles in appreciable quantity unless one of the functional groups is relatively non-reactive.

Various aliphatic or aromatic diisocyanates are commercially available and the following is a partial list:

(1) 2,4-tolylene diisocyanate
(2) p,p'-diisocyanato diphenyl methane
(3) Naphthalene-1,5-diisocyanate
(4) Bi-tolylene diisocyanate
(5) Di-anisidine diisocyanate
(6) Paraphenylene diisocyanate
(7) Metaphenylene diisocyanate
(8) Meta-xylylene diisocyanate
(9) Benzidine diisocyanate
(10) Hexamethylene diisocyanate
(11) Decamethylene diisocyanate The quantities of diisocyanates and polyether-unsaturated glycol mixture when used in accordance with this invention should be close to a one-to-one molar ratio for best results. When used in this ratio, the resulting polyurethanes have good stability and may be milled and stored indefinitely. Evidence of slight cure or set up can sometimes be observed at very slight excess polyisocyanate over a 1:1 equivalent weight ratio of polyisocyanate to the polyether but the one-to-one molar ratio is the most desirable.

In making the polyurethanes, the diisocyanate and polyethers along with the olefinic compound used to furnish crosslinking sites are mixed together and allowed to polymerize at any suitable temperature, preferably at a temperature of about 115° C. or 100° to 140° C. for a time as short as 15 minutes although 4 to 8 hours is preferred. Polymerization at room temperature requires a much longer time.

A polymerization catalyst is preferably used such as iron acetonyl acetonate, octyleneglycol titanate, stearyl titanate, and ferrocene (di-cyclopentadienyl iron).

After polymerization, the urethane polymers are further processed preferably by mastication on a Banbury mixer. Sulfur and other compounding ingredients are mixed into the polyurethane elastomer. After compounding and milling, the elastomers are generally cured for about 10 to 120 minutes at approximately 35 to 60 pounds per square inch steam pressure (280-307° F.). The polyether urethanes thus may be compounded with carbon black, stored and processed with about the same ease as one would experience in processing ordinary rubber compositions.

The following examples, in which parts are by weight unless otherwise stated, illustrate the curing of polyurethane elastomers by sulfur in accordance with the present invention.

EXAMPLE I

A polyurethane was prepared from the following amounts of polyether, diisocyanate and olefinic compound.

Ingredients: No. of moles
Polyether, polytetramethylene-ether glycol, mol. weight 3000 _____ 1.00
Olefinic compound, ricinoleyl alcohol _____ 0.25
Diisocyanate, p,p'-diisocyanato diphenyl methane _____ 1.25

The ingredients were mixed along with an iron acetonyl acetonate reaction catalyst and the mixture was allowed to stand for two hours at 115° C. in a closed container. The resultant polymer was masticated on a rubber mill with the following ingredients to form a homogeneous mixture as indicated below.

Ingredients: Parts
Polyurethane _____ 100
Carbon black (high abrasion furnace) _____ 35
Altax _____ 1
Tuads _____ 1
Sulfur _____ 2
Zinc oxide _____ 3

The milled elastomer was sheeted out and cured in test specimen molds at 287° F. at 40 p.s.i. steam pressure for 45 minutes. The rubber produced had excellent properties as shown in Table I.

*Table I*

|  | Units | Polyether-urethane, Example I |
|---|---|---|
| Modulus, 300% | p.s.i | 1,500 |
| Tensile | p.s.i | 3,550 |
| Elongation | percent | 680 |
| Tensile Permanent Set | percent | 16 |
| Hardness, Shore "A" |  | 65 |
| Tear strength (Crescent) | lbs | 401 |
| Di Mattia (thousand) |  | 100 (0.25) |
| In 205° F. Water: |  |  |
| Modulus, 300% | p.s.i | 815 |
| Tensile | p.s.i | 1,370 |
| Elongation | percent | 500 |
| After aging 6 hours at 300° F.: |  |  |
| Tensile | p.s.i | 500 |
| Elongation | percent | 280 |

EXAMPLE 2

A polurethane was prepared by reacting the following materials.

Ingredients: No. of moles
Polyether, polytetramethylene ether glycol ___ 1.00
Unsaturated organic compound, ricinoleyl alcohol _____ 0.40
Diisocyanate, p,p'-diisocyanato diphenyl methane _____ 1.40

The mixture was polymerized as in Example I and compounded as follows:

| Ingredients | Parts by Weight ||
|---|---|---|
|  | A | B |
| Polyurethane | 100 | 100 |
| Carbon Black (High Abrasion Furnace) | 35 | 35 |
| Tuads | 1 | 1 |
| Sulfur | 2 | 2 |
| Zinc Oxide | 5 | 5 |
| Diisopropyl sulfuramide of 2-mercaptobenzothiazole | 0 | 1 |
| Altax | 1 | 0 |

The polyurethanes were milled and cured at 40 p.s.i. steam pressure for 45 minutes and the properties tested as shown in Table II.

*Table II*

|  | Polyurethane A | Polyurethane B |
|---|---|---|
| 300% Modulus (p.s.i.) | 1625 | 1375 |
| Tensile Strength (p.s.i.) | 4175 | 4050 |
| Elongation (p.s.i.) | 610 | 690 |
| Tensile Set (p.s.i.) | 16 | 16 |
| Durometer, Shore "A" (p.s.i.) | 68 | 65 |
| Tear (p.s.i.) | 414 | 377 |
| Di Mattia Flex crack growth | 75,000 | 100,000 |
| Aged 6 hours at 300° F: |  |  |
| 300% Modulus (p.s.i.) | 900 | 850 |
| Tensile Strength (p.s.i.) | 1575 | 1650 |
| Elongation (percent) | 450 | 440 |

The cured polyurethane stock of the present invention may be stored for months and scorching of the gum stock during milling is greatly reduced.

In the examples previously described, the diisocyanates may be substituted in whole or in part by other organic diisocyanates as previously described to yield generally equivalent results although the time of reaction may be slower or faster. The olefinic compounds which furnish double bonds for curing may be substituted for in whole or in part by other unsaturated organic compounds as previously noted in which the hydroxy olefinic compounds have at least five aliphatic carbon atoms directly connected to at least one side of each double bond and located between the double bond and the nearest hydroxyl group or carboxyl group which reacts with an isocyanate group to form a urethane linkage in the main polymer chain.

Furthermore, it is to be understood that in accordance with the provisions of the patent statutes, the particular form of product shown and described and the particular procedure set forth are presented for purposes of explanation and illustration and that various modifications of said product and procedure can be made without departing from my invention.

Having thus described my invention, I claim:

1. A sulfur curable polyether-urethane composition comprising the reaction product of (1) one mole of a saturated poly(alkylene ether) glycol having a molecular weight of above 600, (2) from about 0.9 to 1.5 moles of an organic polyisocyanate, and (3) a material selected from the group consisting of an aliphatic glycol and a cycloaliphatic glycol and consisting of carbon, hydrogen and oxygen and having at least one carbon-to-carbon double bond, said double bond being positioned in the chain joining the hydroxyl radicals of said material, at least one hydrocarbon group of at least 5 consecutive saturated aliphatic carbon atoms positioned in said chain joining said hydroxyl radicals, and one of the carbon atoms of said double bond being attached directly to a carbon atom of said group, and the amount of said material being from 10 to 60 mole percent of the total moles of said poly(alkylene ether) glycol and said material.

2. A sulfur curable polyether urethane composition according to claim 1 where said poly(alkylene ether) glycol has a molecular weight of above 1000, said organic polyisocyanate is an aromatic diisocyanate, the amount of said material is from about 20 to 50 mole percent of the total moles of said poly(alkylene ether) glycol and said material, and said hydrocarbon group has at least 7 consecutive saturated aliphatic carbon atoms.

3. A sulfur curable polyether urethane composition according to claim 2 where said poly(alkylene ether) glycol has a molecular weight of over 1000 to 5000, the mole ratio of said poly(alkylene ether) glycol to said polyisocyanate is about 1:1, and said material contains an alkyl side chain of from 2 to 12 carbon atoms.

4. A sulfur curable polyether-urethane composition according to claim 3 in which said material is a reduced linoleyl alcohol dimer having about two double bonds per molecule.

5. A sulfur curable polyether urethane composition according to claim 3 in which said material is ricinoleyl alcohol.

6. A sulfur curable polyether urethane composition according to claim 3 in which said material is propylene glycol mono-ricinoleate.

7. A vulcanizate comprising a polyether urethane cured with from about 0.2 to 8 parts by weight of sulfur based on 100 parts by weight of said polyether urethane, said polyether urethane comprising the reaction product of (1) one mole of a saturated poly(alkylene ether) glycol having a molecular weight of above 600, (2) from about 0.9 to 1.5 moles of an organic polyisocyanate, and (3) a material selected from the group consisting of an aliphatic glycol and a cycloaliphatic glycol and consisting of carbon, hydrogen and oxygen and having at least one carbon-to-carbon double bond, said double bond being positioned in the chain joining the hydroxyl radicals of said material, at least one hydrocarbon group of at least 5 consecutive saturated aliphatic carbon atoms positioned in said chain joining said hydroxyl radicals, and one of the carbon atoms of said double bond being attached directly to a carbon atom of said group, and the amount of said material being from 10 to 60 mole percent of the total moles of said poly(alkylene ether) glycol and said material.

8. A vulcanizate according to claim 7 in which the ratio of said sulfur to said polyether urethane is about 0.5:100 to 4:100 parts by weight, said poly(alkylene ether) glycol has a molecular weight of above 1000 to 5000, the mole ratio of said poly(alkylene ether) glycol to said polyisocyanate is about 1:1, said polyisocyanate is an aromatic diisocyanate, the amount of said material is from about 20 to 50 mole percent of the total moles of said poly(alkylene ether) glycol and said material, said hydrocarbon group has at least 7 consecutive saturated aliphatic carbon atoms, and said material contains an alkyl side chain of from 2 to 12 carbon atoms.

9. The method which comprises reacting (1) one mole of a saturated poly(alkylene ether) glycol having a molecular weight of above 600, (2) from about 0.9 to 1.5 moles of an organic polyisocyanate, and (3) a material selected from the group consisting of an aliphatic glycol and a cycloaliphatic glycol and consisting of carbon, hydrogen and oxygen and having at least one carbon-to-carbon double bond, said double bond being positioned in the chain joining the hydroxyl radicals of said material, at least one hydrocarbon group of at least 5 consecutive saturated aliphatic carbon atoms positioned in said chain joining said hydroxyl radicals, and one of the carbon atoms of said double bond being attached directly to a carbon atom of said group, and the amount of said material being from 10 to 60 mole percent of the total moles of said poly(alkylene ether) glycol and said material.

10. The method according to claim 9 where said poly(alkylene ether) glycol has a molecular weight of above 1000, said organic polyisocyanate is an aromatic diisocyanate, the amount of said material is from about 20 to 50 mole percent of the total moles of said poly(alkylene ether) glycol and said material, and said hydrocarbon group has at least 7 consecutive saturated aliphatic carbon atoms.

11. The method according to claim 10 where said poly(alkylene ether) glycol has a molecular weight of above 1000 to 5000, the mole ratio of said poly(alkylene ether) glycol to said polyisocyanate is about 1:1, and said material contains an alkyl side chain of from 2 to 12 carbon atoms.

12. The method according to claim 11 in which said material is a reduced linoleyl alcohol dimer having about two double bonds per molecule.

13. The method according to claim 11 in which said material is ricinoleyl alcohol.

14. The method according to claim 11 in which said material is propylene glycol monoricinoleate.

15. The method which comprises curing a polyether urethane with sulfur, the ratio of said sulfur to said polyether urethane being from about 0.2:100 to 8:100 parts by weight, said polyether urethane comprising the reaction product of (1) one mole of a saturated poly(alkylene ether) glycol having a molecular weight of above 600, (2) from about 0.9 to 1.5 moles of an organic polyisocyanate, and (3) a material selected from the group consisting of an aliphatic glycol and a cycloaliphatic glycol and consisting of carbon, hydrogen and oxygen and having at least one carbon-to-carbon double bond, said double bond being positioned in the chain joining the hydroxyl radicals of said material, at least one hydrocarbon group of at least 5 consecutive saturated aliphatic carbon atoms positioned in said chain joining said hydroxyl radicals, and one of the carbon atoms of said double bond being attached directly to a carbon atom of said group, and the amount of said material being from 10 to 60 mole percent of the total moles of said poly(alkylene ether) glycol and said material.

16. The method according to claim 15 in which the ratio of said sulfur to said polyether urethane is about 0.5:100 to 4:100 parts by weight, said poly(alkylene ether) glycol has a molecular weight of above 1000 to 5000, the mole ratio of said poly(alkylene ether) glycol to said polyisocyanate is about 1:1, said organic polyisocyanate is an aromatic diisocyanate, the mount of said material is from about 20 to 50 mole percent of the total moles of said poly(alkylene ether) glycol and said material, said hydrocarbon group has at least 7 consecutive saturated aliphatic carbon atoms, and said material contains an alkyl side chain of from 2 to 12 carbon atoms.

References Cited in the file of this patent
UNITED STATES PATENTS 2,808,391  Pattison _____ Oct. 1, 1957

FOREIGN PATENTS 863,403  Germany _____ Jan. 19, 1953
895,648  Germany _____ Nov. 5, 1953

OTHER REFERENCES

Cassias et al.: "Castor-Oil-M-Tolylene Diisocyanate Polyurethane & Related Modifications as Compounds, Princeton, University Plastics Laboratory, Tech. Report No. 26c, P.B. Report No. 122974, July 25, 1952.

Heiss et al.: Ind. Eng. Chem., 46, 1498–1503.

Hackh's Chem. Dict., 3rd ed., page 30, col. 2.